United States Patent [19]

Callaway

[11] 3,884,314

[45] May 20, 1975

[54] SNOWMOBILE SKI SUSPENSION SYSTEM

[75] Inventor: Mel Callaway, Riverside, Calif.

[73] Assignee: Yamaha International Corporation, Buena Park, Calif.

[22] Filed: Apr. 12, 1974

[21] Appl. No.: 460,352

[52] U.S. Cl............................ 180/9.54; 280/124 A
[51] Int. Cl............................................ B62m 27/02
[58] Field of Search............. 180/9.52, 9.54, 5 R, 3, 180/6; 305/44; 280/7.12, 7.14, 96.2 R, 124 A

[56] References Cited
UNITED STATES PATENTS

| 3,195,878 | 7/1965 | Rosky et al. | 280/124 A |
| 3,649,040 | 3/1972 | Snider | 180/3 R |
| 3,674,104 | 7/1972 | Gostomski | 180/5 R |
| 3,692,130 | 9/1972 | Stacy | 180/5 R |
| 3,760,895 | 9/1973 | Martinmaas | 180/5 R |
| 3,777,830 | 12/1973 | Christensen et al. | 180/5 R |
| 3,777,831 | 12/1973 | Hale | 180/5 R |

Primary Examiner—Philip Goodman
Assistant Examiner—John A. Carroll
Attorney, Agent, or Firm—Lindenberg, Freilich, Wasserman, Rosen & Fernandez

[57] ABSTRACT

A system for suspending the skis of a snowmobile on the chassis thereof, including a spindle extending upwardly from the ski, and upper and lower members connecting the middle and upper end of the spindle to two longitudinally spaced locations on the snowmobile chassis, the suspension members being adjustable in length to thereby permit adjustments in the chamber and caster of the skis.

3 Claims, 7 Drawing Figures

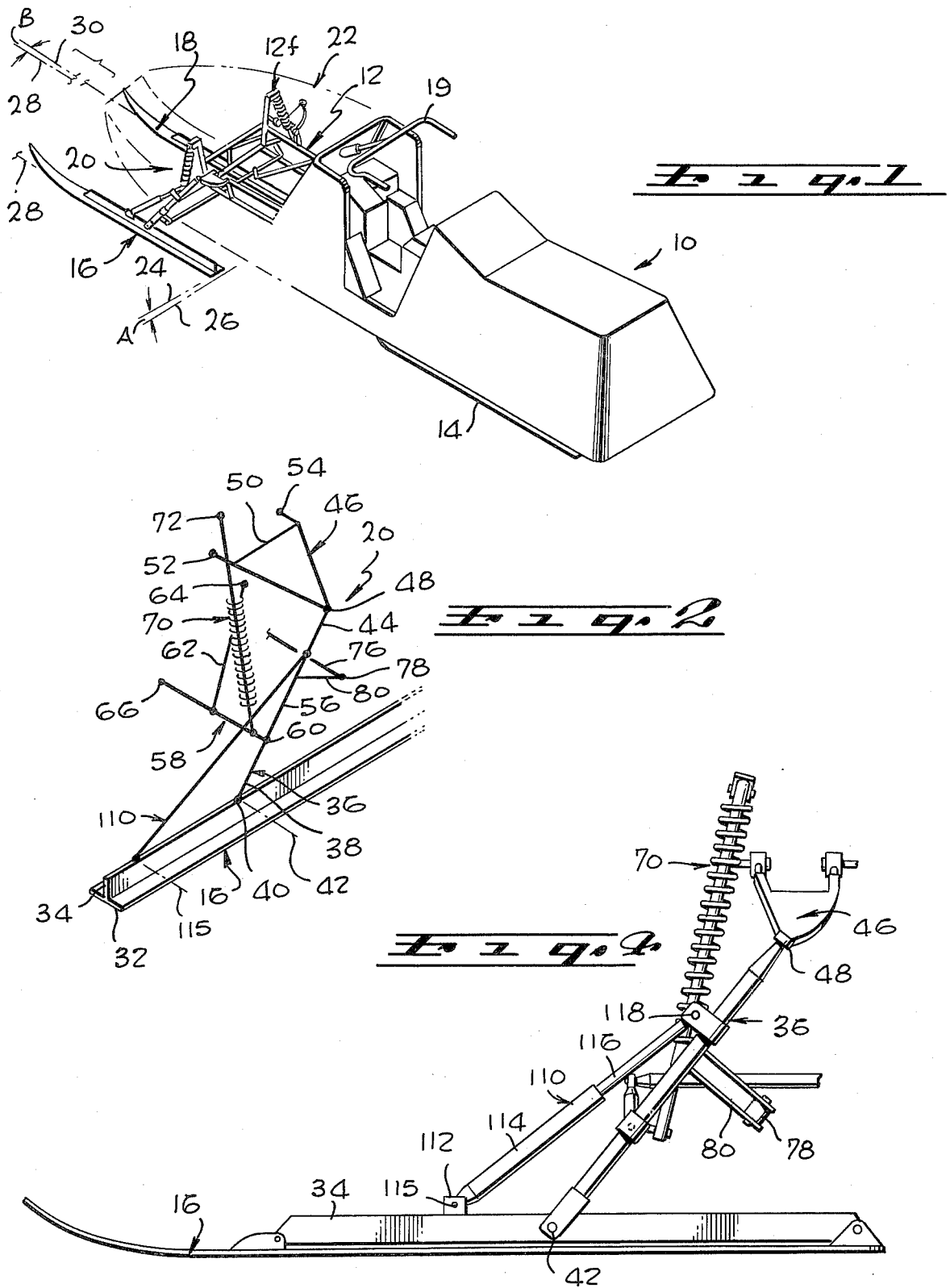

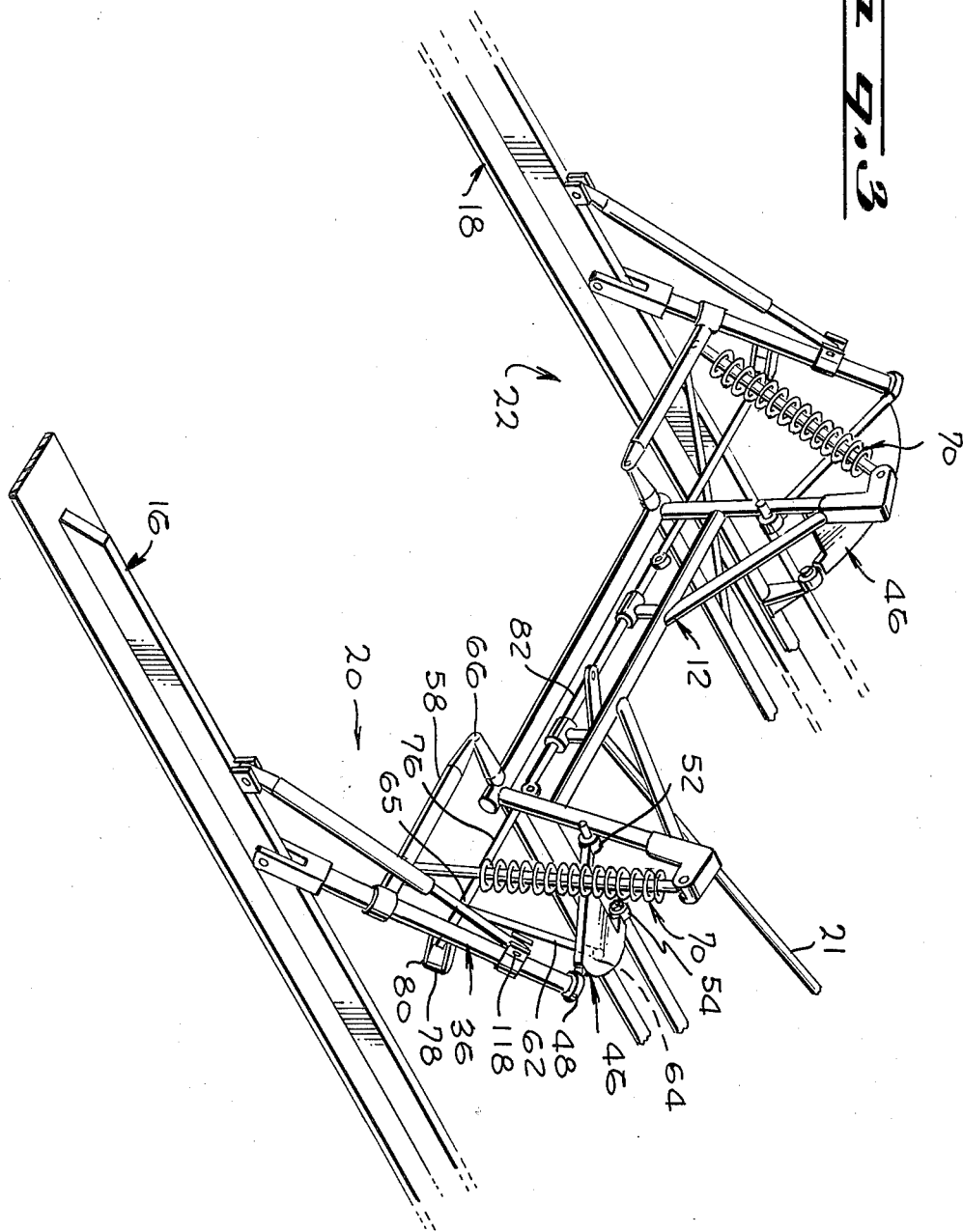

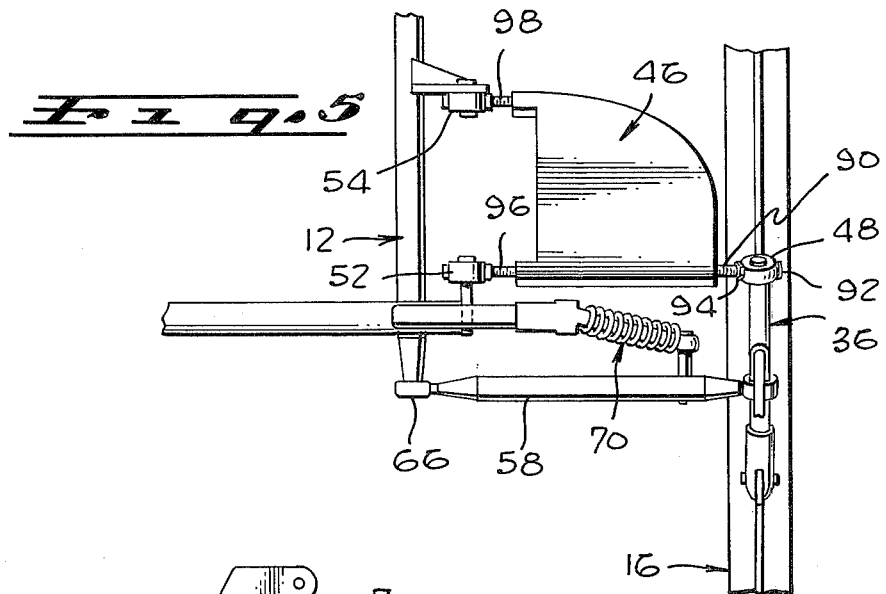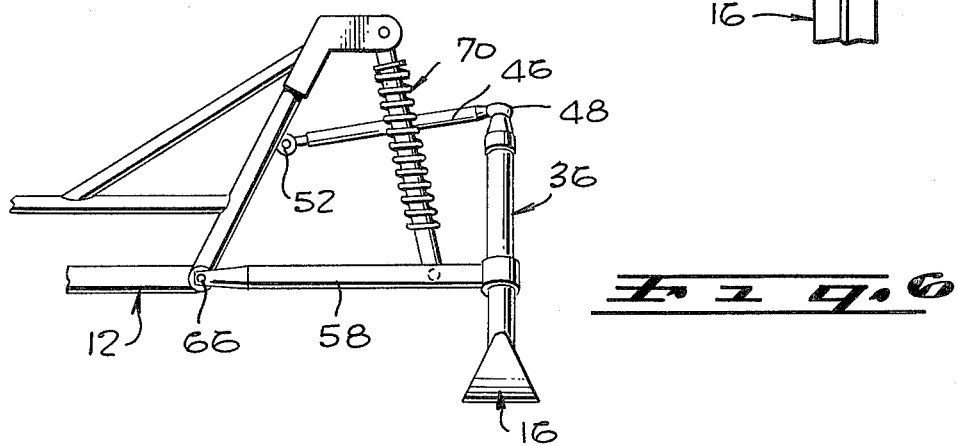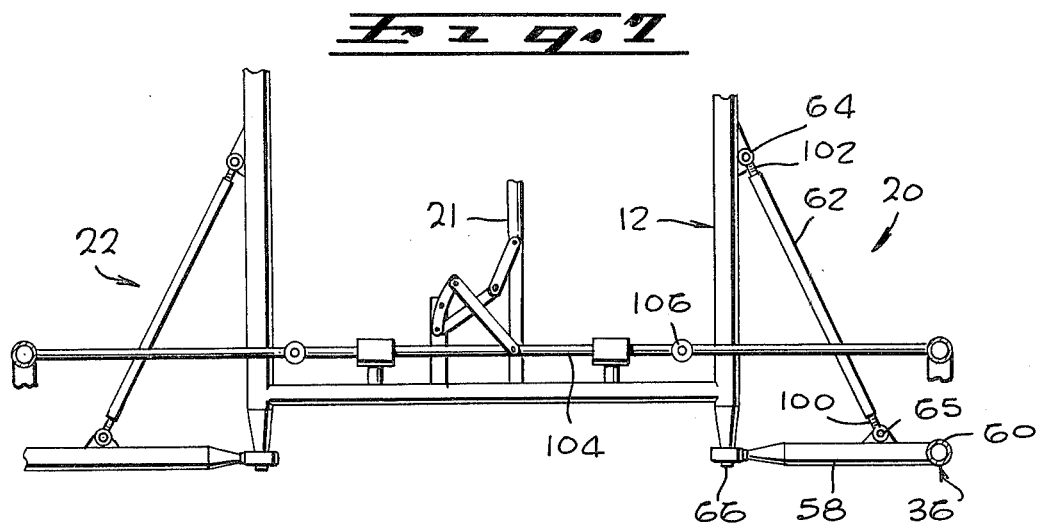

SNOWMOBILE SKI SUSPENSION SYSTEM

BACKGROUND OF THE INVENTION

This invention relates to snowmobiles, and more particularly, to a system for connecting the front of the snowmobile chassis to the skis.

Snowmobiles normally have a chassis whose rear portion is supported and driven along the ground by a track, and whose front end is supported and steered on the ground by a pair of skis. The suspension system used for connecting the chassis to the skis has an important bearing on the handling and riding characteristics of the snowmobile. A typical suspension system has included a simple leaf spring with ends mounted on a ski and with a middle portion pivotally connected to one side of the front chassis portion, and a dampener connecting the front portion of the ski to the chassis. Such an arrangement does not permit adjustment of the camber of the skis, which is the angle between the ground and the bottom surface of the skis, or adjustment of the caster of the skis, which is the degree of parallelism of the skis. Where snowmobiles are to be used in racing or other situations requiring the best possible performance, it is desirable to permit rapid adjustments of camber and caster prior to each use of the vehicle. This permits the racer to change the handling characteristics in accordance with the particular snow conditions or to compensate for any changes in the handling characteristics from the optimum.

SUMMARY OF THE INVENTION

In accordance with the present invention, a suspension system is provided for supporting the chassis of a snowmobile on the skis thereof, which permits rapid adjustments of the camber and caster of the skis as well as providing good riding and handling characteristics. The suspension apparatus for each ski includes a spindle whose lower end is connected to the ski so that rotation of the spindle steers the ski. A lower suspension member connects the middle of the spindle to the chassis while an upper suspension member connects the upper end of the spindle to the chassis. In addition, drag means extend with a rearward directional component from each suspension member to the chassis. The effective lengths of the suspension members and drag means can be readily adjusted to tilt the skis to alter their camber, or to slightly alter their direction of pointing relative to one another so as to alter the caster. The weight of the chassis is transferred to the skis by shock absorbers that extend from the top of the chassis to the lower suspension members. Steering of the skis is accomplished by a steering rod connected to the spindle.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a left and rear perspective view of a snowmobile constructed in accordance with the invention, with the front body portion thereof removed to illustrate the general arrangement of the ski suspension system;

FIG. 2 is a left side and front perspective view of a portion of the ski suspension system of FIG. 1, with the elements being shown in simplified view in order to facilitate the understanding thereof;

FIG. 3 is a more detailed left side and front perspective view of the ski suspension system of the snowmobile of FIG. 1;

FIG. 4 is a partial side elevation view of the suspension system of FIG. 3;

FIG. 5 is a partial plan view of the suspension system of FIG. 3;

FIG. 6 is a partial front elevation view of the suspension system of FIG. 3; and FIG. 7 is a partial plan view of the suspension system of FIG. 3.

DESCRIPTION OF THE PREFERRED EMBODIMENTS

FIG. 1 illustrates a snowmobile 10 constructed in accordance with the invention, which includes a chassis 12 with a rear end that is supported and driven along the ground by a track 14, and with a front end that is supported and steered on the ground by a pair of skis 16, 18. The skis are steered by turning of handle bars 19. Each ski is supported on the front portion 12f of the chassis by a separate suspension system 20, 22 that is designed not only to provide good handling characteristics, but which also permits rapid adjustment of the handling characteristics. In particular, the suspension systems permit the operator or a mechanic to change the camber of each ski, the camber being the angle A between a line 24 lying on the plane of the bottom of the ski and a line 26 which extends along the ground, with both lines extending transversely to the length of the ski. Each suspension system also permits rapid adjustment of the caster of the skis, which is the angle B between two imaginary lines 28, 30 that extend parallel to the lengths of the two skis, 16, 18, the caster angle indicating whether the skis are parallel or whether there is a toe-in or toe-out condition.

FIG. 2 illustrates the general arrangement of the members of each suspension system which connects a ski such as 16 to the front end of the chassis. The ski 16 includes a runner 32 that runs along the ground and a beam 34 that extends along the runner to stiffen it and to provide mounting locations for the suspension system. The suspension system 20 includes a spindle 36 with a lower end 38 that is pivotally mounted at 40 on the ski beam 34. The pivot joint 40 is constructed to permit free pivoting of the spindle about a transverse axis 42, but to allow rotation of the spindle about this axis to cause a corresponding steering rotation of the ski. The upper end 44 of the spindle is connected by an upper suspension bracket 46 to the chassis. The bracket 46 has an outer end that is connected by a ball joint 48 to the spindle to allow universal pivoting thereon. The inner end 50 of the bracket is connected at two locations 52, 54 to the chassis, the two locations 52, 54 being longitudinally spaced, or in other words spaced along the length of the snowmobile chassis. The middle 56 of the spindle is connected by a lower suspension member 58 to the chassis, with the member 58 connected by a ball joint 60 to the spindle to permit universal pivoting therewith. A drag link 62 connects the lower suspension member 58 to a point 64 on the chassis which is spaced longitudinally behind the attachment point 66 where the lower suspension member 58 is mounted on the chassis. The lower suspension member 58 and the portion of the upper suspension bracket 46 that extends between the ball joint 48 and mounting point 52, together control the camber of the ski 16. The drag link 62 and the portion of the upper bracket 46 that extends between the ball joint 48 and the mounting location 54, control the caster of the ski 16 with respect to the other ski.

The weight of the chassis is transferred to the ski through a shock absorber 70 whose upper end is connected at 72 to the chassis and whose lower end is connected at 74 to a middle portion of the lower suspension member 58. Steering of the ski is accomplished by lateral movement of a steering link 76 which is pivotally connected at 78 to a steering link bracket 80 which is in turn, fixed to the spindle 36. As shown in FIG. 3, the steering link 76 is connected to a central steering link 82 that can be shifted back and forth in accordance with turning of the shaft 21 of the handle bar assembly 20. The same suspension and steering arrangement is utilized on each side of the frame 12, so that the suspension 22 is substantially identical in function to the suspension 20.

In order to permit free up and down movement of the ski 16, ball joints are utilized to connect the spindle at 60 and 48 to the lower suspension arm 58 and upper suspension bracket 46, respectively. In a similar manner, ball joints are utilized at 52, 54, 64, and 66, to connect the inner ends of the suspension members, including the bracket 46, drag arm 62, and lower suspension member 58, to the frame of the snowmobile. This arrangement permits the spindle 36, and therefore the ski, to move up and down freely over undulations in the ground, while supporting the weight of the snowmobile transferred to it by the shock absorber 70. However, the camber of the ski is closely controlled by the relative lengths of the lower suspension member 58 between the bearings 60, 66, and the upper suspension bracket 46 between the bearing locations 48, 52. In a similar manner, the caster of the ski is closely controlled by the relative lengths of the drag member 62 between the bearings 64, 65 and the length of the upper suspension member 46 between the bearings 54, 48.

In accordance with one feature of the present invention, the camber and caster of the skis can be readily modified by a mechanic in the field, without significatnly affecting the ability of the ski to move up and down over undulations in the ground. This is accomplished by providing adjustments of the length of the suspending members of the suspension system between the bearings thereof. FIG. 5 illustrates the manner in which the upper suspension bracket 46 is connected through the ball joint 48 to the spindle 36, and through the ball joints 52, 54 to the frame 12 of the snowmobile. The bracket 46 contains a threaded stud 90 which projects through a hole in a ball of the ball joint 48, and which is held in position by a pair of nuts 92, 94. The nuts 92, 94 can be turned to shift the position of the stud 90 so as to draw the top of the spindle 36 towards or away from the frame 12. The bracket has additional threaded studs 96, 98 which are similarly held by nuts that permit adjustment of position. The camber of the ski 16 can be altered by adjusting the position of the stud 90 or 96 by turning the nuts thereon. Shifting of the position of nut 98 alters camber and also makes a slight adjustment of caster.

FIG. 7 illustrates the mounting arrangement for the lower suspension arm 58. This arm 58 is held by ball joints at 60 and 66 to the spindle 36 and frame 12, respectively. However, no provisions for adjustment of the length of the arm 58 are necessary, inasmuch as any change in camber can be accomplished by adjusting the mounting of the upper suspension bracket. The drag arm 62, however, is provided with threaded ends at 100, 102 where it is mounted on the ball joints 65, 64 that respectively connect it to the lower suspension arm 58 and frame 12. The balls of the two ball joints 64, 65 have internally threaded holes which receive the threaded ends 100, 102 of the drag arm 62, one of the threads being right-handed and the other being left-handed. Accordingly, turning of the drag arm 62 in one direction causes its effective length to increase, while turning in the other direction causes its effective length to decrease. Alteration of the effective length of the drag arm 62 alters the caster of the ski 16, so that the relative positions of the two skis can be varied towards a toe-in or toe-out condition.

The steering mechanism is constructed so that it does not interfere with adjustments of camber and especially caster of the skis. To this end, the steering mechanism is provided with a central steering bar 104 which is coupled to the shaft 21 of the handle bar assembly 20, so that it is shifted laterally in accordance with turning of the handle bars. The steering link 76 is connected by a ball joint at 106 to an end of the center bar 104, so that the link 76 is free to pivot in accordance with changes in caster and camber of the ski 16.

As illustrated in FIG. 4, a dampener 110 connects a point on the spindle 36 to a point 112 along the ski beam 34. The dampener 110 includes a cylinder 114 with a lower end connected at 112 to the ski beam to permit pivoting about a lateral axis 115, and also includes a piston 116 with its lower end slideable in the cylinder and with its upper end pivotally connected at 118 on an upper portion of the spindle 36. When the piston 116 slides in the cylinder 114, some air leaks out of the cylinder, but the leakage is low enough so that the dampener serves to resist pivoting of the ski about the lower spindle axis at 42. This serves to allow the ski to pivot so as to ride over bumps in the ground, but to dampen out oscillations of the ski.

Thus, the invention provides a suspension system for snowmobile skis, which permits free movement of the skis to enable them to individually move over undulations in the ground, and yet the system permits rapid adjustment of both the camber and caster of the skis. A mechanic can readily make adjustments to compensate for snow conditions, the particular type of track to be run over, or to compensate for any damage to the frame of the machine or any peculiarities that may arise, so as to provide optimum handling characteristics for the machine.

Although particular embodiments of the invention have been described and illustrated herein, it is recognized that modifications and equivalents may readily occur to those skilled in the art and consequently, it is intended that the claims be interpreted to cover such modifications and equivalents.

The embodiments of the invention in which an exclusive property or privilege is claimed are defined as follows:

1. A snowmobile comprising:
a chassis having front and rear ends;

a track drive coupled to the rear end of the chassis for propelling it along the ground;

a pair of laterally spaced skis positioned at the front end of the chassis for supporting and steering the chassis, each ski including a strip-shaped runner in contact with the ground and an upwardly extending beam extending along the length of the runner;

a pair of spindles, each having a lower end pivotally mounted about a transverse axis on the upwardly extending beam of one of said skis and extending with a rearward and upward incline therefrom to an upper spindle end;

a pair of lower suspension members, each having an inner end pivotally mounted on the chassis and an outer end universally connected to a middle portion of a spindle between the ends thereof;

a pair of upper suspension members, each having an inner end pivotally mounted on the chassis and an outer end universally connected to the upper end of a spindle;

two pairs of drag means, each drag means connecting one of said suspension members to a chassis location which is positioned behind the inner end of the corresponding suspension member;

a pair of shock absorbers, each extending between the chassis and one of the suspension members to transfer part of the chassis weight to the suspension member; and a pair of dampeners, each extending from a position on a corresponding spindle which is above the lower spindle end, to a location on an upwardly-extending beam of a corresponding ski which is forward of the lower spindle end.

2. A snowmobile comprising:

a chassis having front and rear ends;

a track drive coupled to the rear end of the chassis for propelling it along the ground;

a pair of laterally spaced skis positioned at the front end of the chasis for supporting and steering the chassis;

a pair of spindles, each having a lower end pivotally mounted about a transverse axis on one of said skis and extending with a rearward and upward incline therefrom to an upper spindle end, and each having a middle portion between said upper and lower ends;

a pair of lower suspension members, each having an inner end pivotally mounted on the chassis and an outer end pivotally connected to the middle portion of a corresponding spindle;

a pair of upper suspension members, each having an inner end pivotally mounted on the chassis and an outer end pivotally connected to the upper end of a corresponding spindle;

a pair of lower drag means, each connecting a corresponding lower suspension member to a chassis location which lies behind the inner end of the lower suspension member;

a pair of upper drag means, each connecting a corresponding upper suspension member to a chassis location which lies behind the inner end of the upper suspension member; and a pair of shock absorbers, each extending between the chassis and one of the suspension members to transfer part of the chassis weight to the suspension member;

at least one of said drag means being of adjustable effective length, whereby to permit adjustment of the caster of the skis.

3. A snowmobile comprising:

a chassis having front and rear ends;

a track drive coupled to the rear end of the chassis for propelling it along the ground;

a pair of laterally spaced skis positioned at the front end of the chassis for supporting and steering the chassis;

a pair of spindles, each having an upper portion coupled to said chassis and a lower end; and a pair of dampeners, each having an upper end coupled to a corresponding spindle and a lower end;

said ski including an elongated strip-shaped runner in contact with the ground and an upwardly extending beam extending along the length of the runner, the lower end of each spindle and the lower end of each dampener being pivotally connected to the upwardly extending beam of a corresponding ski.

* * * * *